United States Patent Office 3,546,033
Patented Dec. 8, 1970

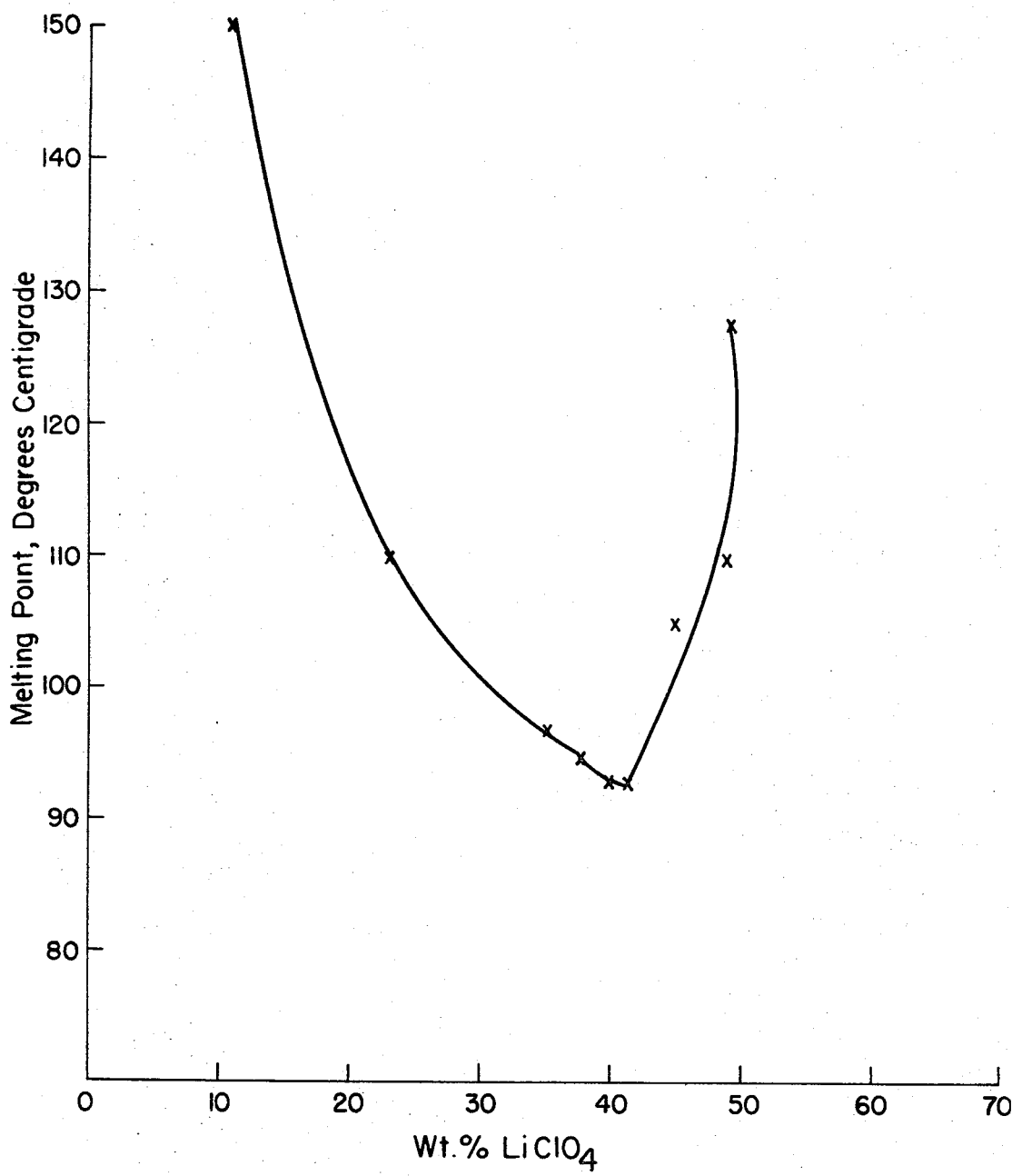

3,546,033
LOW MELTING BINARY NITRONIUM PERCHLORATE PROPELLANT MIXTURES
John P. Longwell, Scotch Plains, N.J., assignor to Esso Research and Engineering Company, a corporation of Delaware
Filed June 20, 1960, Ser. No. 37,514
Int. Cl. C06d 5/00
U.S. Cl. 149—5                                    15 Claims The present invention relates to low melting mixtures containing nitronium perchlorate and their use in solid rocket propellant systems. One aspect of the invention concerns preparing low melting mixtures of nitronium perchlorate and high energy nitrates or perchlorates and mixtures thereof. Another aspect of the invention relates to coating the mixtures to improve their stability. Still another aspect concerns the use of these mixtures as oxidizers in rocket propellants, particularly solid propellants containing conventional inorganic fuels, such as boron, aluminum and the metal elements in Groups I and II of the Periodic Chart.

Nitronium perchlorate (NPC) is a highly useful oxidizer in the chemical field, especially in chemical propellants employed in pure rockets. It is a difficult chemical to work with and use because it is highly reactive and relatively unstable in the presence of moisture and many other chemical compounds. Considerable work has been carried out on methods for coating NPC to improve its stability. Some problems have been encountered in these methods, mainly because the NPC has needle-shaped crystals which are difficult to coat properly.

In accordance with the present invention NPC is admixed with a sufficient amount of a high energy solid inorganic substance to make a mixture having a melting point below the decomposition temperature of NPC. The decomposition temperature of the aforementioned oxidizer varies according to the method employed for its determination. It will be found that it generally lies between 120 and 150° C. In order to avoid significant decomposition of the NPC in the mixture, enough of the high energy melting point lowering substance or substances should be used to obtain a melting point that is substantially below the decomposition temperature of NPC. For instance if the NPC used commences to decompose at an appreciable rate at 120° C., the mixture should have a melting point which does not exceed about 110° C. In other words, the melting point of the mixture is preferably about 10° below the temperature at which rapid decomposition is observed.

It has been found that inorganic nitrates and perchlorates are highly suitable for the purposes of the present invention because they not only reduce the melting point of NPC but are high energy substances that are useful oxidizers themselves.

Among the nitrates and perchlorates which may be employed to reduce the melting point of NPC are alkali metal perchlorates, such as lithium perchlorate, sodium perchlorate and potassium perchlorate; nitrogen-containing perchlorates, such as ammonium perchlorate; inorganic nitrates, such as ammonium nitrate, lithium nitrate, sodium nitrate and other similar substances. While outstanding binary mixtures can be obtained with lithium perchlorate, in other instances, it is sometimes desirable to use ternary mixtures containing, for instance, ammonium perchlorate, lithium perchlorate and NPC.

The amount of inorganic nitrate or perchlorate used to produce the desired melting point should not exceed more than about 65 wt. percent of the total mixture unless it has oxidizing properties substantially equivalent to that possessed by NPC. It is suggested that not more than about 50 wt. percent of the melting point decreasing substance be employed if the resulting mixture is to be used in a high energy rocket propellant system.

Lithium perchlorate is a preferred substance because when blended with NPC in amounts ranging from about 25 to 45 wt. percent of the mixture it produces a composition having a melting point substantially below the lowest decomposition temperature (120° C.) of NPC. While the other substances also produce low melting mixtures, it is generally necessary to use much larger amounts of them in order to obtain blends which can be processed.

The accompanying drawing is a graph showing the melting points of various mixtures of NPC and lithium perchlorate.

Homogeneous, low melting NPC-containing substances, which are preferably eutectic mixtures, may be conveniently prepared by grinding from about 5 to 95 wt. percent NPC with from 5 to 95 wt. percent of a high energy nitrate and/or perchlorate. Of course, as mentioned above, not more than about 65 wt. percent of the nitrate or perchlorate should be used unless it is a strong oxidizer itself. The ingredients may be ground together in a mortar and pestle or, if the substances are finely divided, they may be admixed in a tumbler or other such device.

The melting point of the mixture may be determined in a melting point apparatus by raising the temperature at the rate of about 10 to 15° per minute. If the temperature is permitted to rise very slowly, the decomposition temperature of the mixture is sometimes lower than that noted when the temperature rises at the rate of about 10° per minute. In determining the melting point of a given blend, it will be noticed that in most instances the sample will become wet before it fuses and becomes completely liquid. The temperature at which the latter observation is made is considered the melting point for the purposes of this invention. Sometimes partial decomposition may be noticed, as evidenced by the appearance of bubbles, before the sample melts. Since some decomposition of NPC may take place while processing the mixture at elevated temperatures, it is advisable in such instances to use a slight excess of NPC to take the place of the material lost during processing.

The low melting mixtures may be cast into any suitable form by melting them in a mold and permitting the melted mixture to solidify and eventually reach room temperature. Any suitable method of molding, including extrusion through a die, may be employed. For instance, the mixture may be introduced into a mold having a heating element, heated to a temperature which is a few degrees above the melting point of the mixture and cooled after the mixture has completely liquefied in the mold. Other methods for molding the mixtures of the present invention will be apparent to those skilled in the art.

Where the oxidizers are to be used in a rocket propellant, it is desirable to make pellets or rod-shaped substances of them. Small round pellets having average diameters of about 10 to 200 microns are highly suitable for coating processes. They also pack well to produce masses having relatively high densities. This is a valuable characteristic because in rocket propellants weight per volume is an important property.

In one embodiment of the invention, about 30 to 45 wt. percent lithium perchlorate is mixed with 55 to 70 wt. percent NPC until a homogeneous blend is obtained and the resulting mixture is heated to a temperature that is a few degrees above the melting point of the mixture, i.e. about 100° C., in a spherical mold and held at that temperature until the solid particles become liquid. The spheres obtained from the mold when it is cooled may be coated with a high molecular weight organic substance, such as a wax or polymer, or a metal, such as aluminum in accordance with the following processes.

In the first process, the solid oxidizer mixture is coated with high molecular weight substances such as polyvinyl chloride, polyethylene, polypropylene, paraffin wax, silicons, and other organic coating materials. The foregoing substances may be applied to the surface of the oxidizer in several ways. For example, a melted wax can be admixed with the molded oxidizer particles. This method can only be utilized where the melting point of the coating material is below the melting temperature of the oxidizer mixture.

The oxidizer pellets may be tumbled with melted or liquefied wax or low molecular weight resin in a suitable device for a sufficient time to cover the pellets with a coating that is at least 0.5 mil thick but not more than 10 mils thick. It has been found that coatings which are about 1 to 3 mils thick are particularly suitable for use in high energy rocket propellants. Since the organic coatings have a relatively low fuel value, it is essential to avoid applying too much of the coating substance to the oxidizer since excessive amounts will significantly reduce the specific impulse of the final propallant. Generally, it is advisable to use less than 10 wt. percent of such coating substances where the oxidizer is intended for use in propellants of the aforementioned type.

In another process, the oxidizer particles are admixed with a solution of the coating substance and thereafter the solvent, which is a low boiling liquid, is evaporated. Halogenated or nitrated organic liquids are preferred as solvents because they do not react with the oxidizers at ambient temperatures.

The resins and waxes which may be used to protect the NPC mixture can be generically described as hydrocarbons or substances having hydrocarbon backbones; that is to say, they have carbon to carbon bonds along the principal chain. Some of the polymers may contain combined halogen atoms, especially chlorine and fluorine, that have been substituted for part or all of the hydrogen atoms attached to the carbon chain, for example, polyvinyl chloride and the copolymer of hexafluoropropylene and vinylidene fluoride. The softening or melting point of the resin or wax should be substantially above room temperature and is preferably at least 50° C. Most of the useful organic coating materials have softening points (Ball and Ring method) between 60 and 200° C. and/or intrinsic viscosities of 0.2 to 4 or 5.

After the oxidizer particles have been tumbled or mixed with the liquid organic coating material for from a few seconds to 10 minutes or more at an elevated temperature which is below the melting point of the mixture, e.g. 35 to 90° C., the coated particles are separated from the coating substance by gravity separation or otherwise and dried. The drying temperature will vary with the melting point of the particular blend.

Among the inert solvents which may be used in the preparation of the coating solution are carbon tetrachloride, chloroform, nitromethane, tetranitromethane, and similar solvents. Some of these solvents have a slight insolubility for NPC and should be saturated with NPC before use. In general the most suitable solvents are the low molecular weight liquid halogenated and nitrated hydrocarbons. While inert liquids containing up to 10 carbon atoms per molecule may be used, the preferred carbon range for the solvent is 1 to 6. The low molecular weight, highly volatile inert solvents are particularly useful because they are easily evaporated or otherwise removed during the drying step.

Still another method for coating the NPC mixtures is known as the vapor decomposition process and involves (a) subliming or (b) decomposing an inorganic substance and depositing the metal in said substance on the surface of the particles. The sublimation or decomposition of the inorganic coating material is carried out at a temperature which is well below the decomposition temperature of the oxidizer. The vaporization and coating steps should be carried out at reduced pressures approximating a vacuum, that is, below 1 micron of mercury absolute pressure and at temperatures below room temperature. The preferred coating temperature in this process is about −10 to −35° C. These low temperatures are required because NPC has an appreciable vapor pressure even at 0° C. If the vapor pressure of the coated substance is over 1 micron, adherent metal coatings are not obtained.

In the sublimation process, a film of metal having a boiling point between about 500 and 2800° C., preferably between 1000 and 2100° C., is sublimed at about −20° C. under less than 1 micron of mercury absolute pressure in a suitable vessel such as a crucible. The sublimed metal is condensed on particles of nitronium perchlorate which are continuouslly agitated on a vibrating table containing cooling coils. The coils may contain a cold brine solution or a mixture of acetone and Dry Ice at about −40° C. When the particles have a coating of sufficient thickness they are removed from the condensing zone and new particles are introduced into the zone to take their place. This coating process may take from 10 seconds to 30 minutes and usually results in the formation of particles having metal coatings that are 0.01 to 2 mils in thickness. The preferred thickness is between about 0.1 and 0.5 mil.

The vapor deposition or vapor plating process permits the use of high energy fuels, such as aluminum, in the coating operation. This feature has particular importance in high energy rocket propellants wherein the quantity of low fuel value material is critical. Of course, care must be taken not to exceed the stoichiometric amount of fuel needed to react with the oxidizer since the unreacted fuel would merely add weight to the propellant. This is not usually a problem since it is generally necessary to employ additional fuel to react with the excess oxidizer. As mentioned above, the metal used to coat the NPC mixture should have a boiling point below 2800° C. and preferably below 2100° C. It should not only be vaporizable but should have the additional property of being an excellent fuel. The metals employed in this embodiment of the invention are preferably selected from Groups I–A, II–A, III–A and IV–B of the Periodic Chart of Elements shown on pages 56–57 of Lange's Handbook of Chemistry, 8th edition. Among the metals which may be used in the present process are lithium, magnesium, beryllium, boron and especially aluminum. In addition to aluminum, beryllium and boron are the preferred metal coating substances.

The thermal decomposition process is carried out in a similar manner to that described above. For instance, organometallics, such as organoaluminums, organoboron compounds, organotitanium, etc. may be decomposed to release the metal which in turn coats the nitronium perchlorate particles.

In another embodiment of the invention, the NPC mixture is first coated with an organic substance in the manner described above and then a thin coating of metal, such as aluminum, is applied to the coated pellet via the vapor deposition process.

The coated NPC pellet is readily compounded with other conventional ingredients used in rocket propellants and pressed or extruded into a grain of any suitable design. The finished propellant may be a solid cylindrical mass or it may comprise a cylindrical shaped body having a star-shaped or circular conduit passing through its center along the longitudinal axis. While the coated particles of the present invention have special application to solid rocket propellants often employed in pure rockets, it also may be used in hybrid liquid-solid propellant systems.

The amounts of fuel, oxidizer and binder used in formulating the propellant will of course vary according to the particular needs. Generally speaking, it is between about 10 and 40 wt. percent fuel and 3 and 20 wt. percent binder, with the balance being occupied by the oxidizer which in this case is the nitronium perchlorate mixture. A suitable high energy rocket propellant may comprise 30 wt. percent aluminum, 10 wt. percent binder and 60 wt. percent coated nitronium perchlorate-lithium perchlorate.

The binder may be any suitable substance such as steam-cracked petroleum resins, isoprene-isobutylene butyl rubber, natural rubber, polyurethane, polynitrourethane or "double base" which is a 1:1 mixture of nitrocellulose and nitroglycerine.

The NPC used in the present process is preferably made by the gas phase method which produces nitronium perchlorate that is more stable than that obtained when nitrogen tetroxide is reacted with anhydrous perchloric acid and nitromethane. A suitable method for making the NPC used herein involves adding chlorine dioxide and nitrogen tetroxide to an ozone stream and allowing the resulting mixture to react in the gas phase at $-20°$ to $50°$ C., preferably $10°$ to $35°$ C., for from a couple of seconds to several minutes under pressures of 0 to 100 p.s.i.g. In general, about 0.25 to 0.75 mole of nitrogen tetroxide is contacted with about 0.25 to 0.75 mole of chlorine dioxide or chlorine trioxide and 2 moles of ozone for from 0.01 second to several minutes, preferably for about 2 seconds to about a minute. If ozonized air is introduced into the reaction zone, less nitrogen dioxide or its dimer is needed since the ozonized air contains some nitrogen pentoxide which reacts to form the desired product.

The stable NPC prepared in accordance with the above method is a white solid having a density of about 2.2 g./cc. and a shock sensitivity greater than 90 kg. inches. While it is not highly shock sensitive, it is highly reactive when brought into contact with benzene and other aromatic or olefinic hydrocarbons. It reacts with benzene to make nitrobenzene which can be used to make aniline.

The present invention will be better understood by referring to the following examples:

EXAMPLE 1

Various amounts of lithium perchlorate were mixed with stable nitronium perchlorate and ground in a mortar and pestle until a homogenous blend of finely divided particles was obtained. A sample of each blend was melted on a hot stage melting point apparatus and the melting points were recorded. The data obtained were plotted and the curve formed by the points on the graph is shown in the accompanying figure. By referring to the drawing it can be seen that a highly suitable mixture is obtained when about 40 wt. percent lithium perchlorate is mixed with 60 wt. percent nitronium perchlorate.

Samples containing between 38 and 41 wt. percent lithium perchlorate were placed in an inert cylindrical shaped mold which was about 0.5 centimeter in diameter and the mold, which was plugged at one end, was immersed in a Woods metal bath that was at $120°$ C. A glass rod was used to determine when the mixture in the mold became soft and as soon as this occurred the fused solids were permitted to come to room temperature. The foregoing casting operation was carried out in a dry box to prevent water contamination. The rod-shaped mixtures were cut into particles which were approximately 1 centimeter long.

Spherical pellets of the mixtures were obtained by filling a concave dent in a layer of inert substance with the solid particles. The particles were thereafter melted and then permitted to cool to room temperature. The spheres obtained by this process are highly suitable for most coating processes.

While other nitrates and perchlorates, such as potassium perchlorate and lithium nitrate produce blends having useful melting points, these substances are not preferred because the melting points of the blends are close to the minimum decomposition temperature of NPC. Sometimes the melting point of a binary mixture can be further reduced by the addition of a third ingredient. For instance, a ternary mixture comprising 65 wt. percent ammonium perchlorate, 28 wt. percent lithium perchlorate and 7 wt. percent nitronium perchlorate has a melting point of $112°$ C.

EXAMPLE 2

The eutectic mixture in Example 1, i.e. the sample containing 40 wt. percent lithium perchlorate, is coated with a thermoplastic copolymer of vinylidene chloride and acrylonitrile (Saran F–120), having a viscosity of 200 cps. at $25°$ C. in a 20% solution of methylethyl ketone and a softening point of $90°$ C., but spraying the pellets with a chloroform solution saturated with the copolymer at ambient temperature while tumbling the pellets in a stream of dry nitrogen. The polymer solution is dried with phosphorus pentoxide and saturated with NPC prior to using it. The dried coated particles contain 5 wt. percent of the copolymer which is equivalent to a coating 1 mil thick.

EXAMPLE 3

Pellets of the eutectic mixture in Example 1 are coated with aluminum in accordance with the following vapor deposition process;

Melted aluminum in a ceramic crucible is evaporated in an evacuated chamber, which is at a pressure less than 1 micron of mercury absolute, and the metal is continuously sublimed so that the vapors are reflected onto the pellets in another section of the chamber which is at the same low pressure. The pellets are cooled on a vibrating table which contains coils filled with acetone and Dry Ice at $-40°$ C. The vaporized metal is permitted to condense on the surface of the moving particles so that an even coating about 2 mils thick is deposited on the particles. The particles are exposed to the vaporized aluminum metal for about 5 minutes, after which time they are withdrawn from the condensation chamber and compounded according to the recipes given above for high energy solid rocket propellants.

It is not intended to restrict the present invention to the foregoing examples which are merely given to demonstrate some of the embodiments of the invention. It should only be limited to the appended claims in which it is intended to claim all of the novelty inherent in the invention as well as the modifications and equivalents coming within the scope and spirit of the invention.

What is claimed is:

1. A composition consisting essentially of nitronium perchlorate in a solid mixture with a solid substance selected from the group consisting of inorganic nitrates, inorganic perchlorates and mixtures of said nitrates and perchlorates, said mixture of nitronium perchlorate and said solid substance having a melting point below $120°$ C.

2. A binary mixture of 5 to 95 wt. percent nitronium perchlorate and 5 to 95 wt. percent of a solid selected from the group consisting of inorganic nitrates, inorganic perchlorates and mixtures of said inorganic nitrates and inorganic perchlorates, said binary mixture having a melting point substantially below $120°$ C.

3. A binary mixture of 5 to 95 wt. percent of nitronium perchlorate and of inorganic nitrate giving said binary mixture a melting point substantially below $120°$ C.

4. A composition consisting essentially of nitronium perchlorate in a solid mixture with 5 to 95 wt. percent of inorganic alkali metal perchlorate, said solid mixture having a melting point substantially below $120°$ C.

5. A solid binary mixture of nitronium perchlorate blended by fusion with lithium perchlorate in an amount of about 25 to 45 wt. percent of the mixture, said binary mixture having a melting point substantially below $120°$ C.

6. A eutectic mixture of about 60 wt. percent nitronium perchlorate and 40 wt. percent of lithium perchlorate.

7. A shaped solid mass consisting essentially of nitronium perchlorate blended with a solid selected from the group consisting of inorganic nitrates, alkali metal perchlorates and a mixture of said nitrates and alkali metal perchlorates, said mass having a melting point substantially below $120°$ C.

8. A shaped solid mass as defined in claim 7 having the form of a pellet.

9. A shaped solid mass as defined in claim 7 in which nitronium perchlorate is blended with the lithium perchlorate by melting together.

10. A pellet-shaped solid mass as defined in claim 7 coated with an organic substance.

11. A shaped mass, as defined in claim 7, coated with a metal.

12. A coated solid pellet consisting essentially if nitronium perchlorate blended by fusion with lithium perchlorate, said lithium perchlorate blended in an amount of about 25 to 45 wt. percent of the blend with nitronium perchlorate so that the blend has a melting point substantially below 120° C., and a coating of aluminum on the solid blend of said perchlorates.

13. In a rocket propellant composition containing a fuel and an oxidizer thereof, the improvement which comprises using as said oxidizer a solid blended mixture of nitronium perchlorate and a solid substance selected from the group consisting of inorganic nitrates, inorganic perchlorates and mixtures of said nitrates and perchlorates in proportions to lower the melting point of the mixture to below 120° C., so that the mixture of the nitronium perchlorate and of the solid substance are blended by fusion below the decomposition of the nitronium perchlorate in forming a solid blend.

14. In a rocket propellant as defined in claim 13, the solid blended mixture being in the form of pellets, and said pellets having a protective coating.

15. In a solid rocket propellant containing a fuel and an oxidizer for said fuel, the improvement which comprises using as said oxidizer a solid blend of about 55 to 70 wt. percent nitronium perchlorate and of about 30 to 45 wt. percent lithium perchlorate, said solid blend having a melting point below 120° C., and a protective aluminum coating covering said solid blend in the form of pellets.

References Cited
UNITED STATES PATENTS

| | | | |
|---|---|---|---|
| 2,857,258 | 10/1958 | Thomas | 52—0.5(S) |
| 2,839,423 | 6/1958 | Homer et al. | 117—100M |
| 2,599,978 | 6/1952 | Davis et al. | 117—107D |
| 2,371,000 | 3/1945 | Snelling | 52—11 |

OTHER REFERENCES

Chem. and Eng. New, vol. 37, No. 49, Dec. 7, 1959, p. 62.

Kit et al., "Rocket Propellant Handbook," The MacMillan Co., New York (1960), pp. 201–3.

Sidgwick, "The Chemical Elements and Their Compounds," vol. 1, Oxford Univ. Press, London 1950, pp. 690–1.

BENJAMIN R. PADGETT, Primary Examiner

U.S. Cl. X.R.

117—100; 149—19, 75, 77